(12) United States Patent
Larsson et al.

(10) Patent No.: US 7,028,102 B1
(45) Date of Patent: Apr. 11, 2006

(54) METHOD AND SYSTEM FOR PRESENTING INFORMATION

(75) Inventors: Olof Larsson, Lund (SE); Lennart Fagerberg, Genarp (SE)

(73) Assignee: Axis, AB, Lund (SE)

( * ) Notice: Subject to any disclaimer, the term of this patent is extended or adjusted under 35 U.S.C. 154(b) by 549 days.

(21) Appl. No.: 09/639,011

(22) Filed: Aug. 15, 2000

Related U.S. Application Data (60) Provisional application No. 60/183,281, filed on Feb. 17, 2000.

(30) Foreign Application Priority Data

Dec. 13, 1999 (SE) ................................. 9904552

(51) Int. Cl.
*G06F 15/16* (2006.01)
(52) U.S. Cl. ..................................... 709/246; 709/232
(58) Field of Classification Search ................ 709/206, 709/227, 232, 236, 246; 379/93.24
See application file for complete search history.

(56) References Cited

U.S. PATENT DOCUMENTS

| | | | |
|---|---|---|---|
| 2,949,776 A * | 8/1960 | Field et al. ............... 73/290 R |
| 5,848,415 A | 12/1998 | Guck |
| 5,862,321 A | 1/1999 | Lamming et al. |
| 6,076,076 A * | 6/2000 | Gottfreid ..................... 705/45 |
| 6,141,688 A * | 10/2000 | Bi et al. |
| 6,249,809 B1 * | 6/2001 | Bro |
| 6,285,889 B1 * | 9/2001 | Nykanen et al. ............ 455/557 |
| 6,400,810 B1 * | 6/2002 | Skladman et al. |
| 6,430,601 B1 * | 8/2002 | Eldridge et al. |
| 6,438,585 B1 * | 8/2002 | Mousseau et al. |
| 6,442,595 B1 * | 8/2002 | Kelly ........................ 709/206 |
| 6,557,029 B1 * | 4/2003 | Szymansky |
| 6,725,300 B1 * | 4/2004 | Nagasaka et al. ............. 710/62 |
| 6,738,841 B1 * | 5/2004 | Wolff ......................... 710/62 |

FOREIGN PATENT DOCUMENTS

| | | |
|---|---|---|
| EP | 0924628 | 6/1999 |
| WO | WO 98/4424 | 10/1998 |

\* cited by examiner

*Primary Examiner*—Paul H. Kang
(74) *Attorney, Agent, or Firm*—IP Creators; Charles C Cary (57) ABSTRACT

A presentation of a selected document, stored at a node of a network, is accomplished by means of a system essentially comprising a handheld device, a communication device for a presentation unit and a device that handles presentation requests. By operating the handheld device, a user is able to get a presentation unit specification from said communication device. This specification is then sent, together with an address to a selected document, to a device handling presentation requests. In this device the selected document is then converted to a format suitable for the presentation unit of said communication device, where the converted document is presented. The system could be using WAP-technology for sending information from the handheld device to the device that handles presentation requests and for accessing information on the Internet. Further the system could, for example, be using Bluetooth or IrDA for the communication between the handheld device and said communication device. The system also makes it possible to achieve mobile printing and portable access to documents that cannot be presented on a small display.

15 Claims, 11 Drawing Sheets

METHOD AND SYSTEM FOR PRESENTING INFORMATION

This application claims the benefit of U.S. Provisional Application No. 60/183,281 filed on Feb. 17, 2000, the disclosure of which is incorporated herein by reference.

TECHNICAL FIELD OF THE INVENTION

The present invention relates to a system and methods for presenting electronically stored information on a presentation unit via a network.

BACKGROUND OF THE INVENTION

Today a lot of information is accessible over networks such as Intranets and the Internet. Even information that is to be accessible only for a specific group of users can be accessed over these networks by means of secure communication channels and different identification methods.

To have information presented on a presentation unit nearby, the user must have a computer having access to the network in which the information is accessible and a presentation unit connected to the computer. Thus, people that travel a lot and need access to information stored on, for example, a company server have to carry with them a computer to be able to access the desired information. Further, they either have to have a portable modem with them or have access to a network connection.

The access to information can be accomplished by means of a cellular telephone implementing e.g. the Wireless Application Protocol (WAP), a Personal Digital Assistant (PDA) or a similar device. Then, the user has access to information presented in a format presentable on the cellular telephone. However, if the information is a text document comprising a large amount of text, e.g. a patent application, or a blueprint of a machine to repair, then it is not suitable and often not even possible to present the information on the cellular telephone. Even if the telephone is capable of using a normal Internet Protocol (IP) connection for communication, the information has to be adapted to the small size screen of the telephone or the PDA, and thus it would be very difficult for the user to get an overview or even read such a document.

SUMMARY OF THE INVENTION

The object of the present invention is to make it possible for a person to have information presented to him in a form that is easy to read and overview, even if the information is in a form not suitable for easy reading on a small display.

Another object is to increase the mobility of people who require access to information of the above-mentioned character.

Yet another object is to make it possible for a person to access documents that are electronically stored at a remote location.

These objects are accomplished by means of a method in a system according to claim 1, a system according to claim 6, a method for a device that handles presentation requests according to claim 12, a device that handles presentation requests according to claim 20, a computer program product according to claim 26, a method for a communication device according to claim 27, a communication device according to claim 33, a method for a handheld device according to claim 36, or a handheld device according to claim 39. Preferred embodiments of the invention are disclosed in the dependent claims.

More particularly, according to one aspect of the invention, a method in a system for selection and presentation of information comprises the steps of:
  receiving a presentation unit specification at a handheld device via a short-range wireless connection from a communication device for a presentation unit,
  sending a document address and said presentation unit specification from the handheld device via a network to a device that handles presentation requests,
  receiving said document address and presentation unit specification at the device that handles presentation requests,
  retrieving, at the device that handles presentation requests, the document corresponding to said document address,
  converting, at the device that handles presentation requests, the retrieved document to a format suitable for the presentation unit,
  sending the converted document from the device that handles presentation requests via a network to the communication device for a presentation unit, and
  receiving said converted document at the communication device for a presentation unit.

According to another aspect of the invention, a system for selection and presentation of information, comprises:
  a handheld device enabled to present information retrieved from an information provider on a screen in the handheld device, including:
    an I/O-interface for short-range wireless communication with a communication device for a presentation unit,
    means for receiving a presentation unit specification via said I/O-interface for short-range communication,
    means for sending a document address to a device that handles presentation requests, and
    means for sending a received presentation unit specification to a device that handles presentation requests,
  a device that handles presentation requests, including:
    means for receiving a document address, referring to a document that is to be presented, from a handheld device,
    means for receiving a presentation unit specification from a handheld device,
    means for retrieving the document corresponding to the document address,
    means for converting the retrieved document to a format that is suitable for the presentation unit according to the presentation unit specification, and
    means for sending the converted document to the presentation address,
  a communication device for a presentation unit, including:
    an I/O-interface for short-range wireless communication with a handheld device,
    means for sending a presentation unit specification via said I/O-interface for short-range wireless communication, and
    means for receiving information to be presented by a presentation unit.

The system according to the invention solves the problems accounted for above. When the need for a certain document arises, a user of this system only has to pick up his handheld device, make it display a page where the document is identified, select the desired document on said page for presentation on the presentation unit, make it access a communication device for a presentation unit nearby to exchange data regarding the presentation unit and then have the document presented on said presentation unit. The document can be located at any node of a network as long as there is an address identifying it. The address to the document and a specification of the presentation unit are sent from the handheld device to a device that handles presentation requests and then the document will be sent to the presentation unit in a format that the presentation unit understands.

The system is advantageous by being able to allow essentially any kind of document to be presented on essentially any kind of presentation unit. Further, the system provides this advantage without requiring any additional memory in the handheld device or the communication device for the presentation unit for storing conversion means for various document formats and presentation units. This is achieved by having the requested document converted in a device that handles presentation requests.

Another advantage of performing the conversion in the device that handles presentation requests is that the normal operation neither of the handheld device nor of the communication device is affected negatively by the conversion.

Yet another advantage of performing the conversion in a device that handles presentation requests is that the document does not necessarily need to be sent to the handheld device, at least not before it is converted. This is achieved by making the device that handles presentation requests retrieving a requested document on the basis of a document address received from the handheld device, and therefore the handheld device only needs to communicate the document address in order to make the document available to the device that handles presentation requests. Thus, by having the device that handles presentation requests retrieving the document, bandwidth is saved on the communication paths of the handheld device.

A further advantage of performing the conversion at the device that handles presentation requests, and thus positioning the means for conversion at this location, is that the process of adding new means for conversion or changing of old means for conversion is simplified to a great extent. One reason therefor is that there will be a greater number of handheld devices or presentation units than devices that handle presentation requests, whereby it will be easier for an administrator to perform an upgrade of the conversion means at the device that handles presentation requests. Another reason is that the handheld device is probably not connected to a network all the time. Thus, a user should be required to personally perform an update of conversion means if the means were located in the handheld device.

The system is also advantageous in that the handheld device is able to exchange data with presentation units nearby and can also be made to identify them, thanks to the short-range communication link. Thus, a user does not need to worry about manually identifying a presentation unit and typing in data needed to utilise the presentation unit. As a result, the user is not required to search for parameters needed to accomplish a presentation. These advantages are accomplished by means of the short-range communication link that is established between the handheld device and a communication device for the presentation unit. The short-range communication link can for example be implemented using Bluetooth, IrDA, Open Air, Home RF, Hiper Lan, IEEE 802.11, etc.

In the context of the invention, a presentation unit represents devices that are able to present electronically represented information that cannot be presented satisfactorily on a small display of a handheld device. The presentation unit could be, for example, a screen, a rather large display, an e-book, an electronic picture frame or a printer.

According to a preferred embodiment of the invention, the presentation unit is a device that creates a copy of an electronic document on or in a medium that is highly portable. In that case, a presentation unit could, for example, be a conventional printer or an electronically controllable presentation medium, e.g. e-books, electronic picture frames, etc.

In a preferred embodiment the presentation unit is a printer. By presenting the information via a printer on a printable medium, it is possible to have information presented in high resolution and it is easy get an overview of the information. Another advantage of using a printer as presentation unit is that a printed document format is well known and easy to utilise for essentially any person and that a printed document is easy to add comments to or sign, which still is required in regard of most contracts.

An information service provider is a system that allows access to browsable information on a network, e.g. electronically stored documents, e-mails, drawings, blueprints etc. The information service provider could, for example, be an Internet portal or a server for serving the documents of a company to employees or other people allowed access to them. The server for serving the documents of a company could, for example, be a system such as a unified messaging server.

A handheld device is a device that is enabled to communicate over a network and to display information found at nodes of a network, at least in the form of text but preferably also in the form of pictures. Further, it is preferably of such size that a user could hold it in one hand while operating it with the other. The device could for example be a cellular telephone, a PDA or a small computer. In a preferred embodiment, the device is provided with a browser for presenting and browsing the information available on the network.

In the context of the invention a network is, for example, a communication network for telephones, a Wide Area Network (WAN), a Local Area Network (LAN), the Internet or an Intranet.

In one preferred embodiment of the invention the search or selection of information is performed from the handheld device via a wireless telephone network and a station of the network operator giving the handheld device access to an information service provider, which could be directly accessed at the station or could be accessed via a network. In this embodiment the handheld device is a cellular telephone and the user can search for information as long as the telephone is able to establish contact with the network of the telephone operator. The embodiment has the advantage of making the information available at almost any location, allowing the user to search for a document to present wherever he may be. Then, when a document is found, the user can move to a location where the short-range communication link can be established between the telephone and a communication device for a presentation unit for presentation of the document.

In another preferred embodiment of the invention the search or selection of information is performed from the handheld device via the short-range communication link and the communication device for the presentation unit. In this embodiment the communication device is providing an access point to the Internet, an Intranet or another computer network, from which the information service provider can be accessed. The handheld device of this embodiment could, for example, be a PDA or a small computer. The advantage of this embodiment is that the handheld device does not need any other connection than the short-range communication link for searching or selecting information.

According to a preferred embodiment, the device that handles presentation requests is a module in an information service provider. By providing the device that handles presentation requests as a module in an information service provider, the device is able to share functionality and interfaces with the information service. Further, if the information service provider serves confidential information, the security of the document for presentation is easily maintained.

The system can utilise different paths for sending the presentation file, which is the requested document converted to a suitable format. It is possible to manufacture devices supporting all of the paths or only one or some of the paths. Thus, the paths from the device that handles presentation requests to the presentation unit described below can all be supported by one device.

In one preferred embodiment of the invention, the presentation file is sent from the device that handles presentation requests to the communication device for the presentation unit via at least a wireless network for cellular telephones, the handheld device, and the short-range communication link. One advantage of this embodiment is that the presentation file can be sent to the presentation unit even if the communication device for the presentation unit is lacking a network connection. Another advantage is that the path for the sending of the presentation file has already been established, during the selection of document and presentation unit, and thus the user can be certain that there is a path for sending the presentation file to the presentation unit.

In another preferred embodiment of the invention, the presentation file is sent from the device that handles presentation requests to the communication device for the presentation unit via a network such as the Internet and/or an Intranet. An advantage of this embodiment is that the data rate of the transmission is very high. Another advantage of this embodiment is that the user is able to use the handheld device to perform other tasks when waiting for the presentation.

In yet another preferred embodiment of the invention, the presentation file is sent from the device that handles presentation requests to the communication device for the presentation unit by e-mail. Advantages of this embodiment are that there is no trouble in presenting a presentation file on a presentation unit that is located behind a firewall and that the data rate of the transmission is very high. According to one embodiment, the e-mail containing the presentation file is sent to a mail server handling the e-mails addressed to the presentation unit. Then, either the mail server sends a notice to the communication device regarding the newly received e-mail or the communication device frequently checks the mail server for new mails.

According to one aspect of the invention, a presentation of a selected document, stored at a node of a network, is accomplished by means of a system essentially comprising a handheld device, a communication device for a presentation unit and a device that handles presentation requests. By operating the handheld device, a user is able to get a presentation unit specification from said communication device. This specification is then sent, together with an address to a selected document, to a device handling presentation requests. In this device the selected document is then converted to a format suitable for the presentation unit of said communication device, where the converted document is presented. The system could be using WAP-technology for sending information from the handheld device to the device that handles presentation requests and for accessing information on the Internet. Further the system could, for example, be using Bluetooth or IrDA for the communication between the handheld device and said communication device. The system also makes it possible to achieve mobile printing and portable access to documents that cannot be presented on a small display.

Additionally, the communication device for a presentation unit could be arranged to receive simple information files stored in the handheld device via the short-range communication and to pass the simple information files to the presentation unit. Such files could, for example, be text files comprising the information of a WAP-page, a list of telephone numbers, an address list, etc. To initiate the sending of such information for presentation, the handheld device is provided with a "present" or a "print" command in one of its menus and could also be provided with a button dedicated to performing this action.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF A PRESENTLY PREFERRED EMBODIMENT

Figure 1:
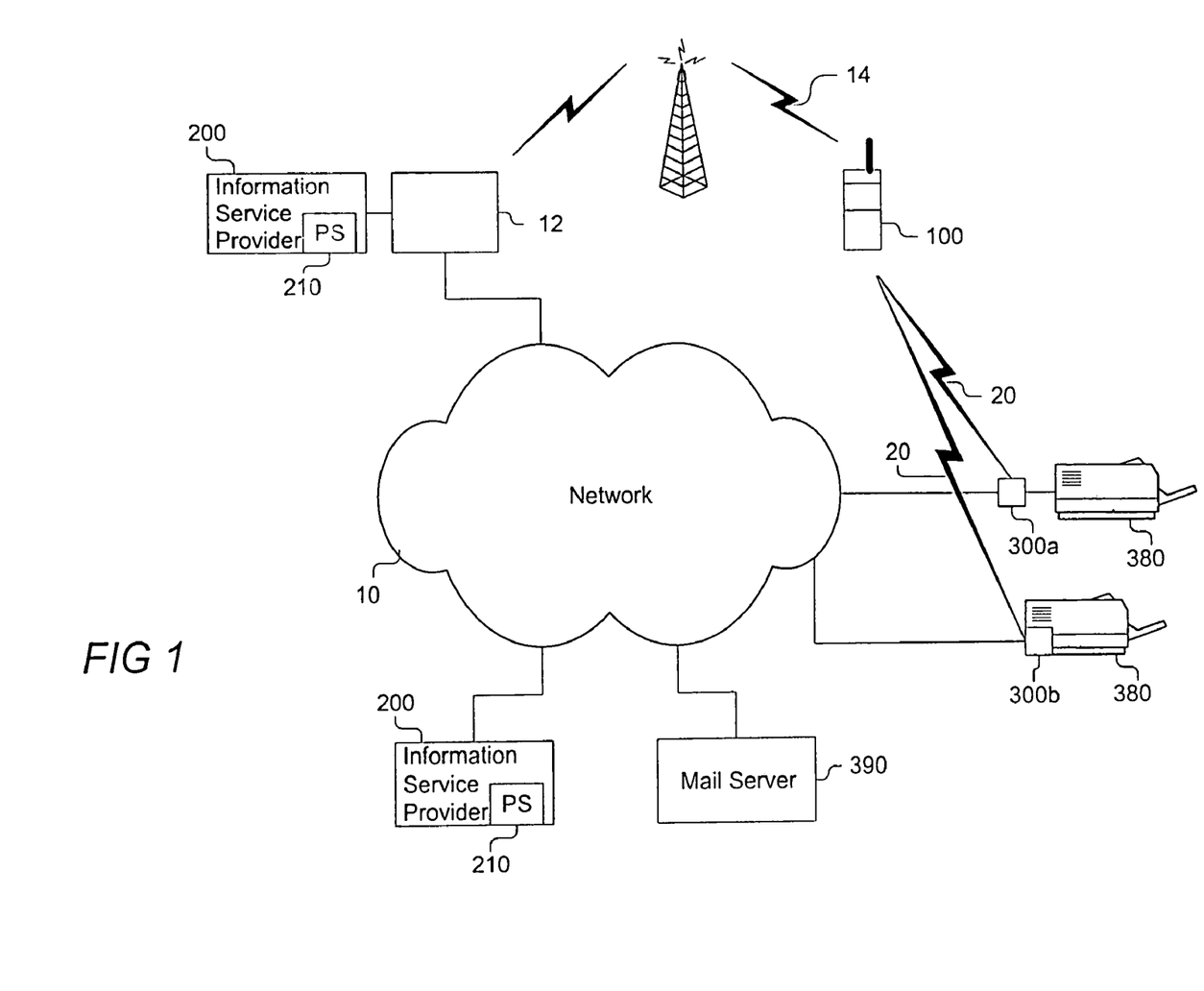
FIG. 1 is a schematic view of a preferred embodiment of the invention.

In FIG. 1, there is shown a preferred embodiment of a document presentation system. The system comprises at least one cellular telephone 100, at least one information service provider 200 and at least one communication device 300, in FIG. 1 represented by 300a and 300b, for a presentation unit.

The cellular telephone 100 is connected to a network 10, e.g. Internet, Intranet, Wide Area Network (WAN), Local Area Network (LAN), via a wireless network 14, e.g. a GSM-network, a TDMA-network, or another wireless network for cellular telephones, and a station 12 of a network operator providing wireless access to the network 10. The access to the network 10 is accomplished by providing the station 12 with a gateway implementing, for example, the Wireless Application Protocol (WAP), Hyper Text Transport Protocol (HTTP) or some other protocol for communicating information over a wireless telephone network. Further, the cellular telephone 100 is provided with an interface for short-range wireless communication, such as Bluetooth.

The information service provider 200 is either directly connected to the station 12 or connected to the network 10. However, the information service provider 200 should have some access to a network 10. The information service provider 200 is either an Internet portal or a server for serving the documents of a company, and is providing access to documents, e-mails and/or other browsable information on the network in a format suitable for the telephone 100. A print service device 210 is preferably built into the information service provider 200, but could also be positioned externally from the information service provider 200. The print service device 210 is a device that handles the request of a document to be printed and is preferably implemented as a software code executed in the information service provider.

The communication devices 300a,b are connecting printers 380 to the network 10. A communication device could, for example, be implemented in a print server. It can be connected to a printer either as an external device 300a, as an internal device 300b or as an embedded device 300b. It is provided with an interface for short-range wireless communication, such as Bluetooth. The main tasks of the communication devices 300a,b are to make sure that a print file sent to one of the communication devices for printing is printed and to provide a cellular telephone with a printer specification. The printer specification comprises data regarding the transport route for a print file that is to be printed, the characteristics of the printer, and is described in more detail below.

The transport route of a print file between the printer service device 210 and the communication device 300a,b can be of different types, depending on what kind of communication device that is arranged to receive the print file. One route is to send the print file directly to one of the communication devices 300a,b over the network 10 using IP protocols. For this purpose a File Transfer Protocol (FTP), an Internet Printing Protocol (IPP), etc can be used. Another route is to send the print file in an e-mail, for example by means of SMTP or IMAP, to an e-mail address dedicated to a chosen communication device 300a,b. The e-mail is then routed to an e-mail server 390, which provides the chosen communication device 300a,b with the print file. Yet another route is to send the print file back to the cellular telephone 100, for example by means of IP and/or WAP Protocols, e.g. as Wireless Session Protocol (WSP) and via the interface for short-range communication 20 transmit the print file to the chosen communication device 300a,b.

Figure 2:
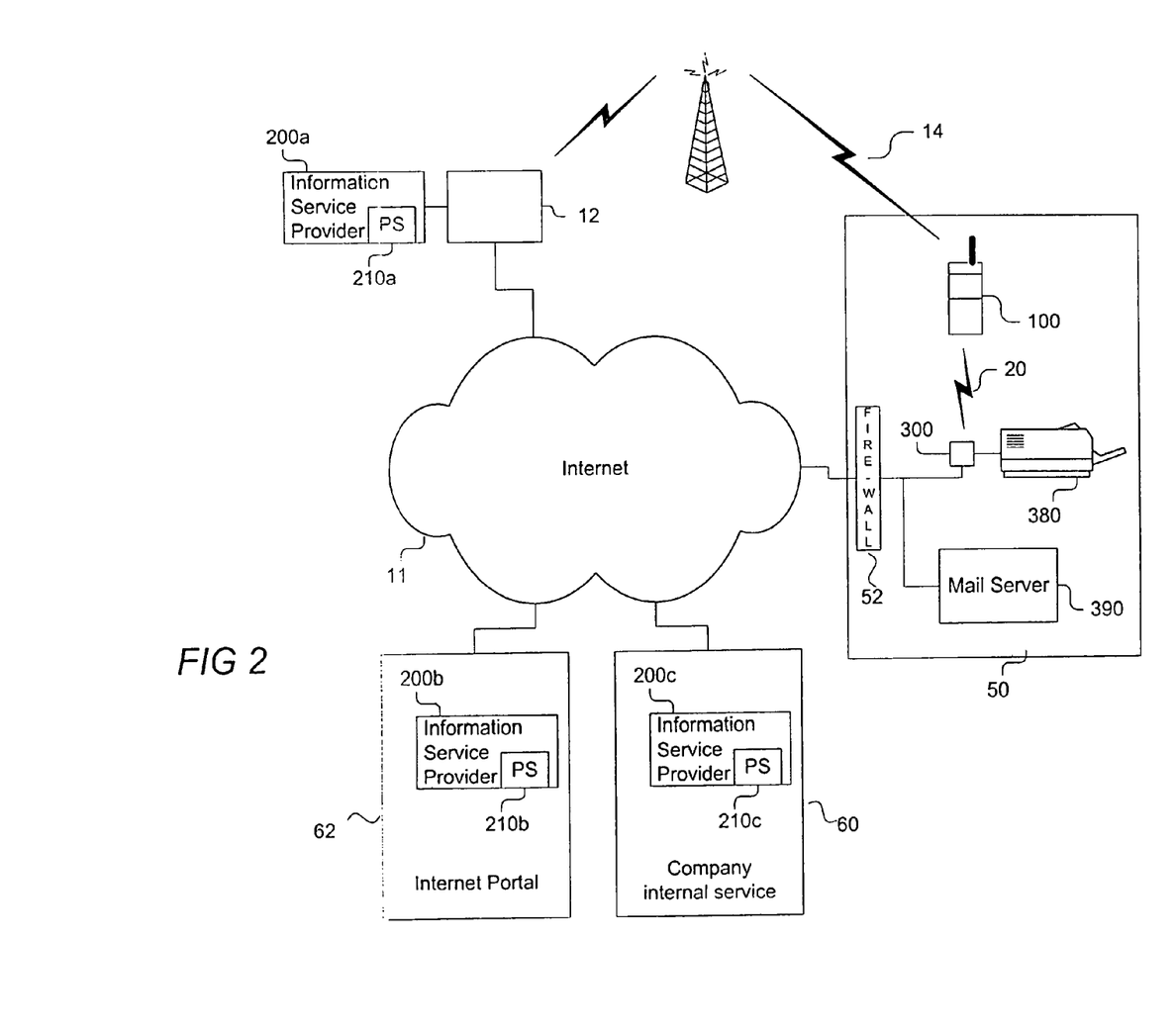
FIG. 2 is a schematic view of a preferred embodiment of the invention utilising one preferred communication device for a presentation unit.
Figure 3:
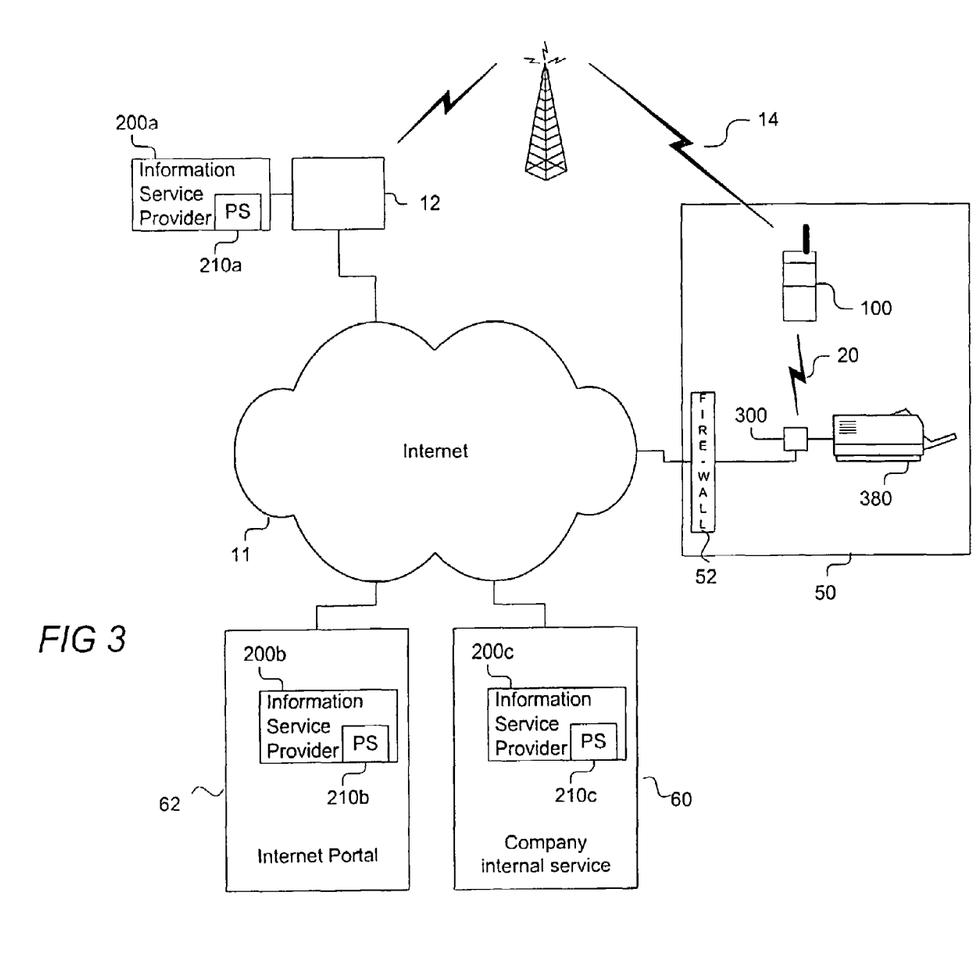
FIG. 3 is a schematic view of a preferred embodiment of the invention utilizing another preferred communication device for a presentation unit.
Figure 4:
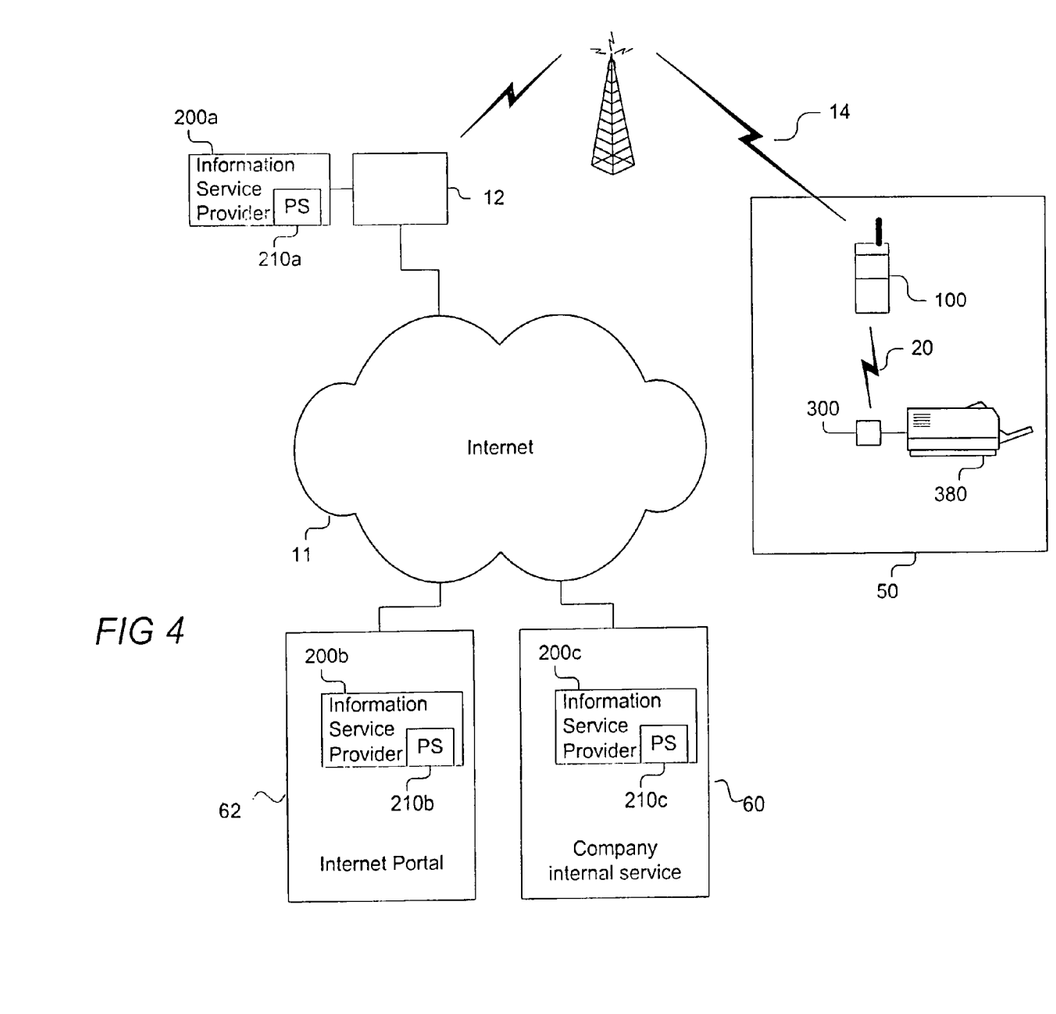
FIG. 4 is a schematic view of a preferred embodiment of the invention utilising yet another preferred communication device for a presentation unit.

In FIGS. 2, 3 and 4 said different communication device implementations are shown. The figures also show more details of one embodiment of the invention, e.g. the network is described as the Internet 11 and the site of the printer is surrounded by a frame 50 that defines the nearby surroundings of the printer. The nearby surroundings of the communication device 300 shall, in this embodiment, be seen as a LAN of a company that is restricted to an office or a building, or a zone in which the short-range communications 20 of a telephone 100 can be received by the communication device 300. As illustrated in FIGS. 2 and 3 a company LAN that is connected to the Internet is usually connected thereto via a security system such as a firewall 52 in order to reduce the risk of unauthorised access to the LAN. Further, there are shown three possible information service providers 200a–c, generally referred to as 200, one provided by the operator at the station 12, one provided as an internet portal 62, and one provided by a company 60 for serving company documents to employees. In all three figures, the procedure for requesting a document to print can be the same, only with a variation of the data in the specification in accordance with the present communication device implementation.

FIG. 2 shows the communication device implementation that receives the print file as an e-mail. The e-mail is sent from one of the print service devices 210a–c, generally referred to as 210, to an e-mail server 390 via the Internet 11, the firewall 52, and finally a LAN. When the print file comprised in the e-mail is received at the mail server 390, it is transmitted to the communication device 300 for printing. By using an e-mail as a carrier of the print file, a possible problem of getting the print file through the firewall 52 is avoided.

FIG. 3 shows the communication device implementation that receives the print file directly from one of the print service devices 210a–c via the Internet, the firewall, and a network connection, which could be either a LAN or a single Internet access point. In this embodiment the print file is addressed direct to the communication device 300.

FIG. 4 shows the communication device implementation that receives the print file from one of the print service devices 210a–c via at least the wireless telephone network 14, the telephone 100 and the short-range communication link 20. In this embodiment the print file does not need to be sent over the Internet if the print service device 210a positioned at the site of the operator is utilised, but the Internet could be used if suitable. This communication device implementation is preferred if there is no network connection or if there is other reasons for not connecting the communication device to a network.

Figure 5:
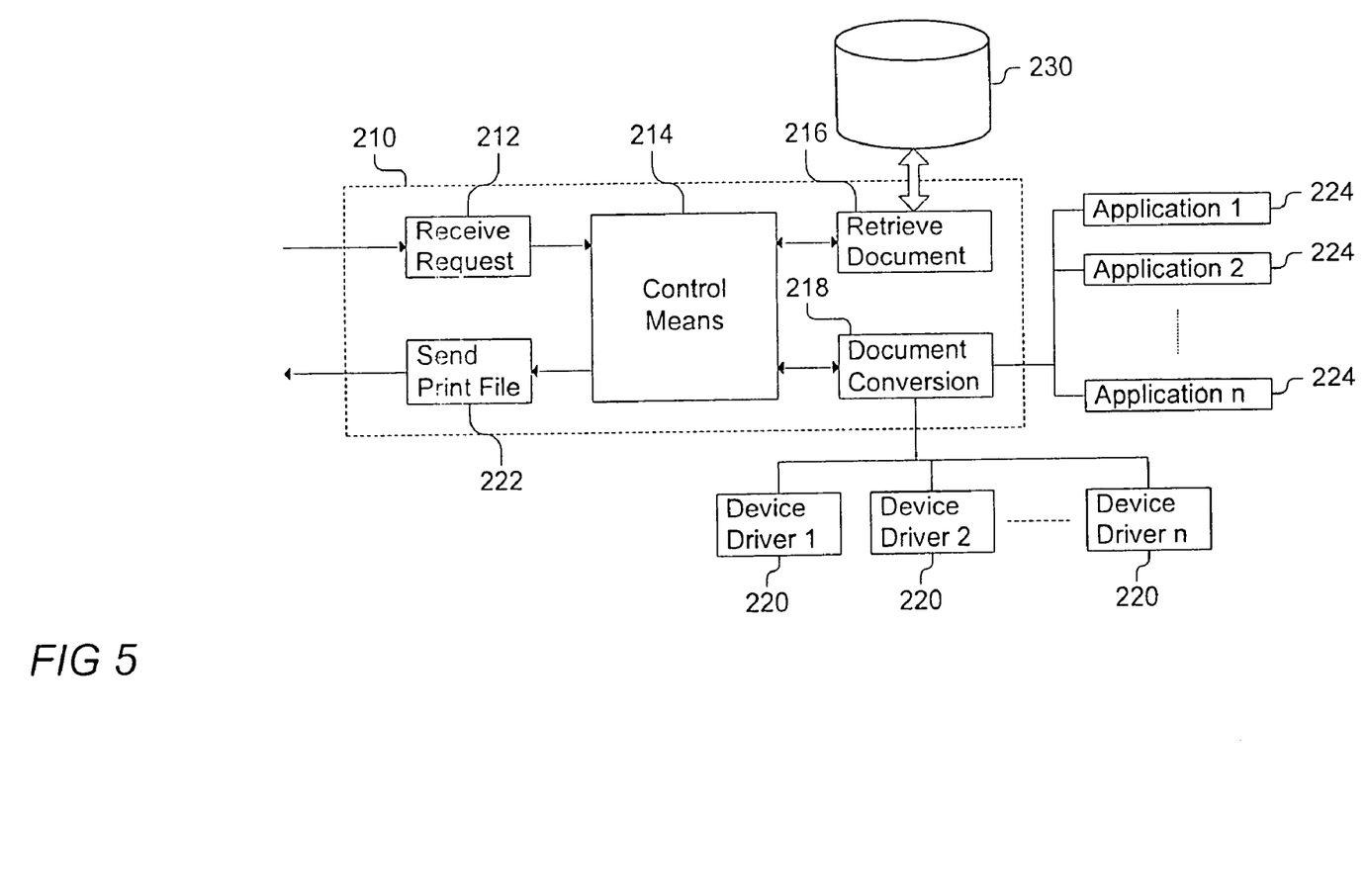
FIG. 5 is a schematic view of a device that handles presentation requests according to a preferred embodiment of the invention.

Now referring to FIG. 5, an embodiment of a print service device 210 is shown. The print service device 210 is provided with means 212 for receiving a request for a document to be printed. The request comprises a document address, indicating where the document is situated, and a printer specification. The printer specification comprises, for instance, information regarding how to send the print file to the printer and the manufacturer and the model of the printer; further details will be described below. The request is passed from the means 212 for receiving a request to a control means 214. The control means 214 then extracts the document address from the request and passes it on to a means for retrieving documents 216.

The means for retrieving documents 216 then retrieves the document from the specified address within a memory 230 that the information provider has access to. The memory 230 could be a storage memory of the information service provider or any memory connected to and accessible via a network such as the Internet or an Intranet. The control means 214 passes the retrieved document and a portion of the printer specification containing data for selecting an appropriate device driver 220 to a document conversion means 218.

The document conversion means 218 checks the retrieved document to find out the format in which the document has been saved. The most simple method for checking the format is to read and interpret the file extension, e.g. ".txt" for a plain text file, ".doc" for a Microsoft® Word file, ".pdf" for an Acrobat® Reader file, ".tif" for a Tagged Image File, ".ps" for a postscript file, ".dwg" for a AutoCad® file, etc. However, only checking the extension of the file is a rather uncertain method for learning the format, because the extension could be wrong or another program could use the same extension. Therefore, in a preferred embodiment, also the contents of the file are checked for portions indicating the format of the file. When the document format has been determined, the document conversion means 218 selects a corresponding application 2.24 for interpreting the document. The applications 224 could be a program dedicated to interpret one or a plurality of formats, or it could be a full version of a program that is even able to create documents of the present format.

Further, the document conversion means 218 uses a portion of the printer specification containing data for selecting an appropriate device driver 220 to determine what device driver 220 to use for creating the print file. The determination can be based on data defining the manufacturer and the model of the printer and/or the Plug and Play (PnP) device ID of the printer.

The conversion means now utilises the selected application 224 and the selected device driver 220 to convert the requested document to a printer file that the target printer can use.

The control means 214 also checks the printer specification for the route that the print file is to be sent. For example, the specification could contain an e-mail address, the IP-address of the communication device, or a return address to the cellular telephone.

The control means 214 provides a send print file means 222 with the information of the route, e.g. an address, and the print file. Then the send print file means 222 sends the print file to the target printer via the requested route.

Figure 6:
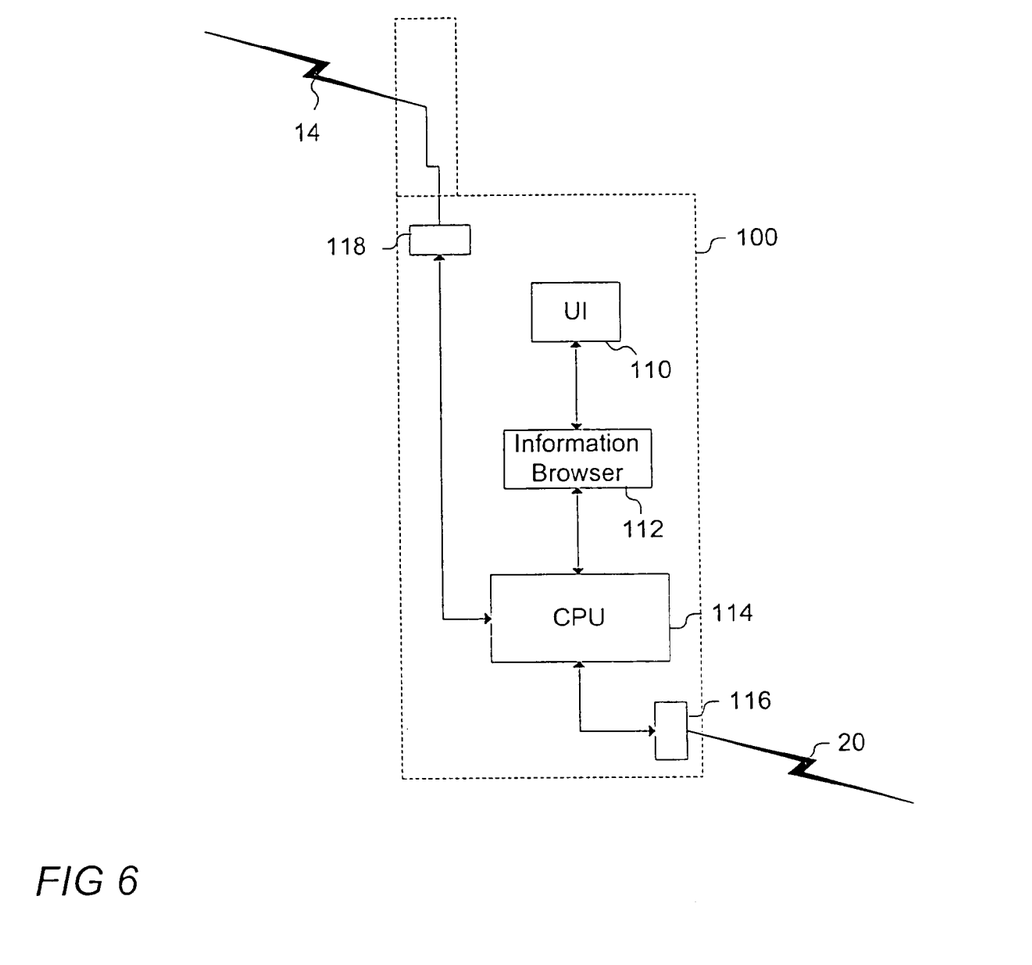
FIG. 6 is a schematic view of a handheld device according to a preferred embodiment of the invention.

Now referring to FIG. 6, there is shown a cellular telephone 100 arranged to request and receive a presentation unit specification via a short-range communication link 20 and to send a document request via a wireless telephone network. The cellular telephone is a WAP-enabled cellular telephone provided with a user interface 110 comprising a touch screen or a display and a keypad. The user interface is connected to an information browser means 112, which, in accordance with the WAP-standard, browses information on a network in response to events at the user interface 110. The information browser is implemented as a program that is processed by a Central Processing Unit (CPU) 114. The communication via the short-range communication link is provided by means of a short-range communication interface 116, preferably implementing Bluetooth, connected to the CPU 114. For the communication over the wireless telephone network 14, the cellular telephone is provided with an ordinary interface 118 for a cellular telephone.

Figure 7A:
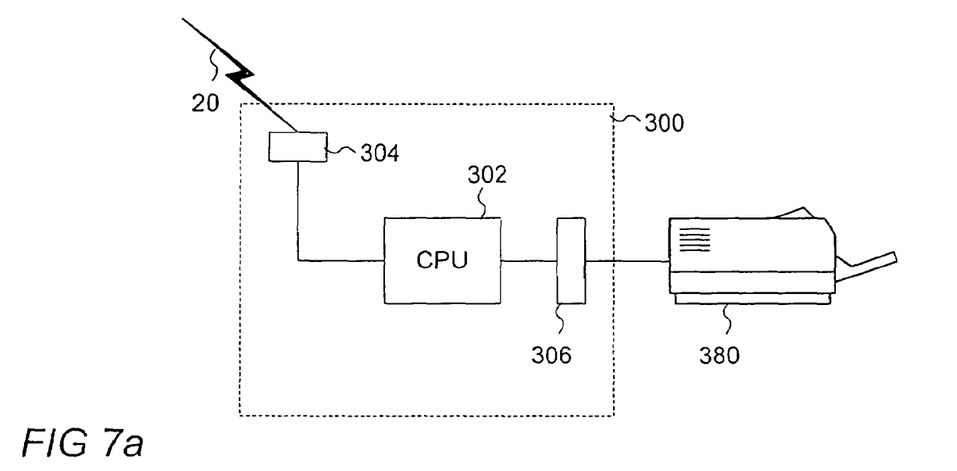
FIG. 7a is a schematic view of one embodiment of a communication device for a presentation unit.
Figure 7B:
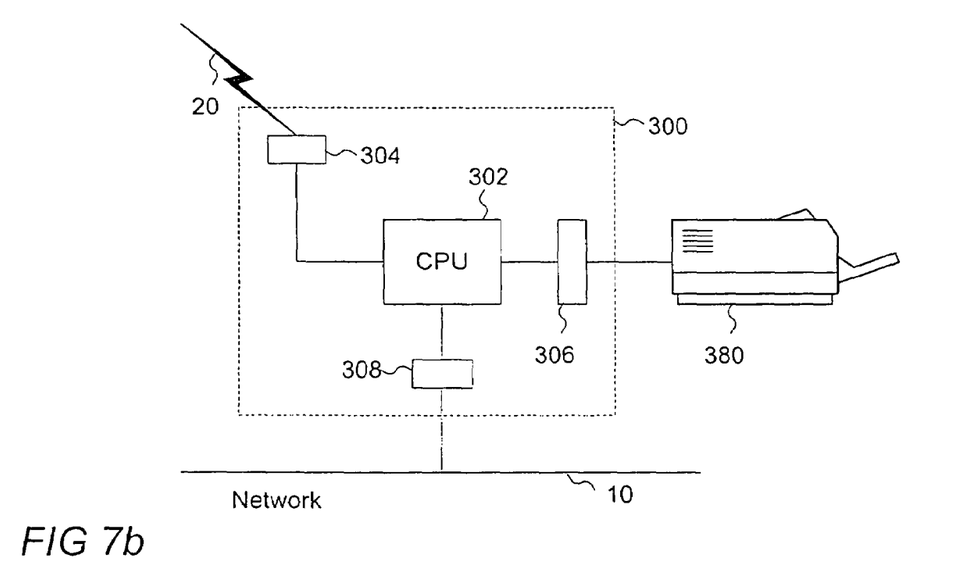
FIG. 7b is a schematic view of another embodiment of a communication device for a presentation unit.

Reference is now being made to FIGS. 7a and 7b, showing two embodiments of a communication device 300 according to the invention. Both embodiments of the communication device 300 are provided with a Central Processing Unit 302 (CPU) for handling the processes of the communication devices 300. They are also provided with an interface 304 for communication via a short-range communication link 20 and an interface 0.306 for connecting a printer 380. The communication device 300 according to FIG. 7a is arranged to receive print files via the short-range communication link 20, in accordance with the route of FIG. 4. The communication device 300 according to FIG. 7b is arranged to receive print files via the network 10, in accordance with the routes of FIG. 2 or FIG. 3. Therefore, the communication device 300 of FIG. 7b is provided with an additional interface 308 for communication over the network 10. Both embodiments of the communication device 300 are provided with protocols for communication via the interfaces of each communication device 300.

The primary object of the printer specification provided to the print service device via the telephone is to identify what formats the printer is able to print and to identify what route the file has to be sent to get to the printer. For these purposes, the print file comprises data regarding the manufacturer and the model of the printer and an address to which the print file is to be sent. The printer specification could, for example, be a text file like the one presented below:

<?xml version='1.0' standalone='yes'?>
<MobilePrint0.1>
<PrinterManufacturer></PrinterManufacturer>
<PrinterModel></PrinterModel>
<PrinterPnPID></PrinterPnPID>
<PrinterID></PrinterID>
<PrinterDeviceDriverURL></PrinterDeviceDriverURL>
<PrinterEmailAddress></PrinterEmailAddress>
<PrinterHostName></PrinterHostName>
<PrinterIPAddress></PrinterIPAddress>
<PrinterIPPURL></PrinterIPPURL>
<PrinterPDLs></PrinterPDLs>
<PrinterLocalName></PrinterLocalName>
<PrinterComment></PrinterComment>
</MobilePrint0.1>

In the specification above, the data of, for example, the printer manufacturer is to be positioned between the <PrinterManufacturer> and the </PrinterManufacturer>.

Now assume that a travelling service technician is travelling around the world servicing and repairing industrial robots. During an assignment he encounters a malfunction in a robot he is not very familiar with. He then needs the documentation of the robot. To get the documentation he asks for a printer having a Printer Server according to a preferred embodiment of the invention. He could also use his cellular telephone and instruct it to check the nearby surroundings for a communication device that is providing the service according to the invention.

Figure 8:
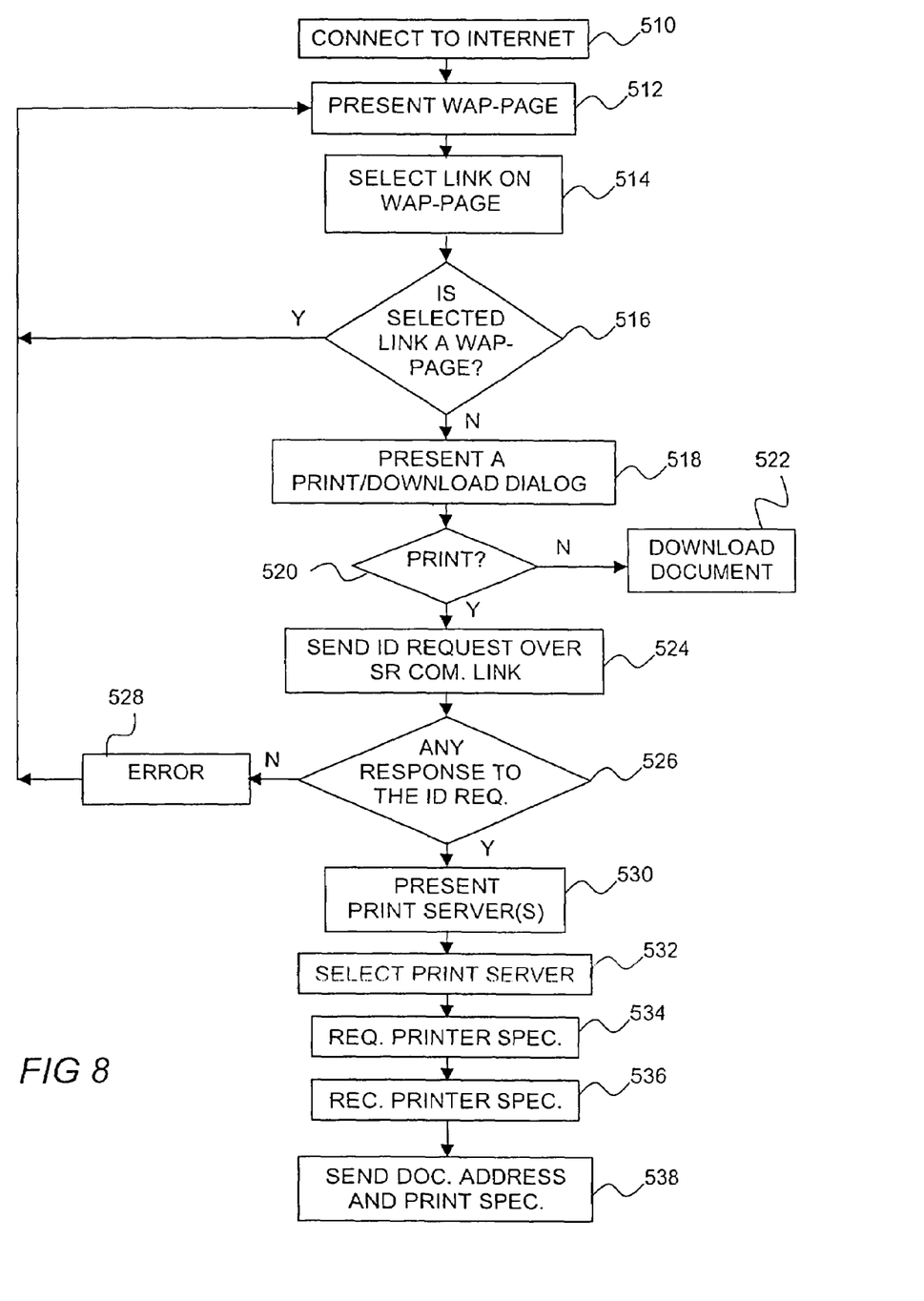
FIG. 8 is a flowchart of a process in the handheld device according to a preferred embodiment of the invention.

Now referring to FIGS. 1 and 8, when the service technician locates a communication device 300, he uses his WAP-enabled cellular telephone 100 to connect, step 510, to an operator that provides a WAP-gateway 12 to the Internet 10. Then a WAP-page is presented, step 512, on the display of the telephone 100 from which he can browse a web of linked WAP-pages by selecting links, 514, presented on the display. Every time a link is selected, the telephone 100 checks if the link is pointing at another WAP-page or not, step 516. If the link points at another WAP-page, that page is downloaded and presented on the display, step 512, and the procedure is repeated, steps 512–516. A known WAP-page is also possible to get to by having the address of it stored in the telephone 100 and then selecting it or simply by typing the address in the information browser of the telephone 100.

In one of the above-mentioned ways, the service technician gets an information page containing a link to the document he needs presented, step 512. Now, he selects the link to the document, step 514, which is not a WAP-page. The telephone 100 checks if the link is pointing at a WAP-page, step 516, and finds out that it is not. Then the telephone 100 presents a print/download dialog, step 518. If the service technician selects download, the document could be downloaded, step 522, to a computer nearby, for example via the short-range communication link. However, if he selects print, the telephone 100 will broadcast an identity request via the short-range communication interface to all communication devices 300 within reach of the telephone 100 in regard of short-range communication 20, step 524. If there is no response to the request, an error message is presented in the display, step 528, indicating that there is no compatible communication device 300 available. Then the telephone 100 returns to step 512 and presents the WAP-page again. If there is one or more communication devices 300 responding to the request, the communication devices 300 are presented on the display, step 530. Then the service technician is enabled to select one of the communication devices 300 displayed, step 530. When one communication device 300 is selected, the telephone 100 sends a request to the selected communication device 300 for a printer specification, step 534. The communication device 300 returns a printer specification which is received at the telephone 100, step 536. Then a print request comprising a document address, given by the selected link, and the printer specification is sent to a print service device 210 of an information service provider 200, step 538, via the wireless telephone network 14.

Figure 9:
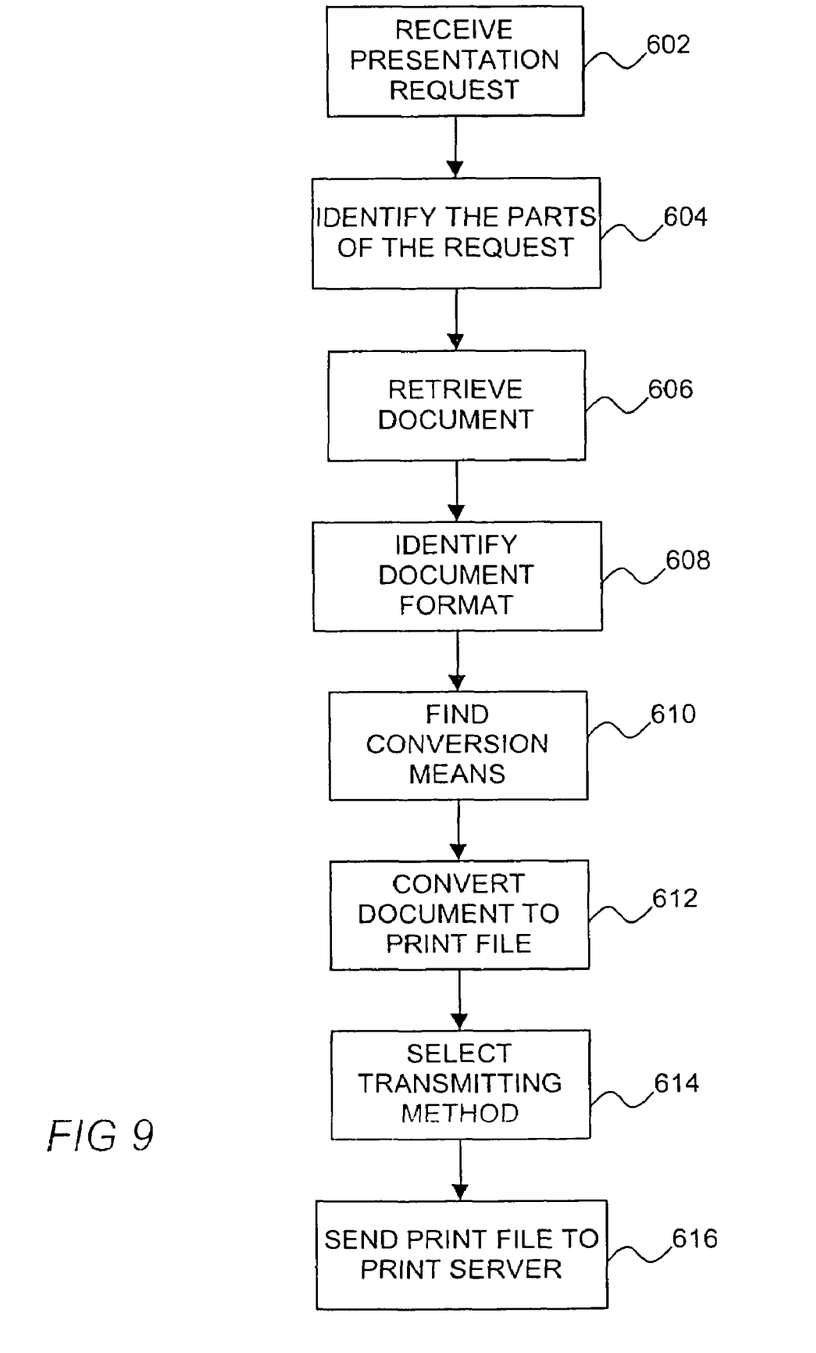
FIG. 9 is a flowchart of a process in the device that handles presentation requests according to a preferred embodiment of the invention, FIG. 10a and b are flowcharts of a process in the communication device for a presentation unit in a preferred embodiment of the invention.

Now referring to FIGS. 1 and 9, the print request is received at a print service device 210, step 602. The device 210 identifies the different parts of the request, step 604, e.g. one document address and one printer specification, and uses the document address to retrieve the document that is to be printed, step 606. Then the format of the retrieved document is identified, step 608, as described above. When the format of the document is established, the print service device 210 uses this information and the presentation unit specification in the request to find an appropriate application for interpreting the document and a device driver, corresponding to the information of the printer specification, for converting the document to a print file suitable for the selected printer, step 610. Then the document is converted to a print file, step 612.

The print file is now ready to be sent to the selected communication device. However, before the print file is sent, the print service device selects a transmitting method in accordance with an address given in the printer specification, step 614. Thereafter the print file is sent to the communication device via one of the routes described above, step 616.

Figure 10A:
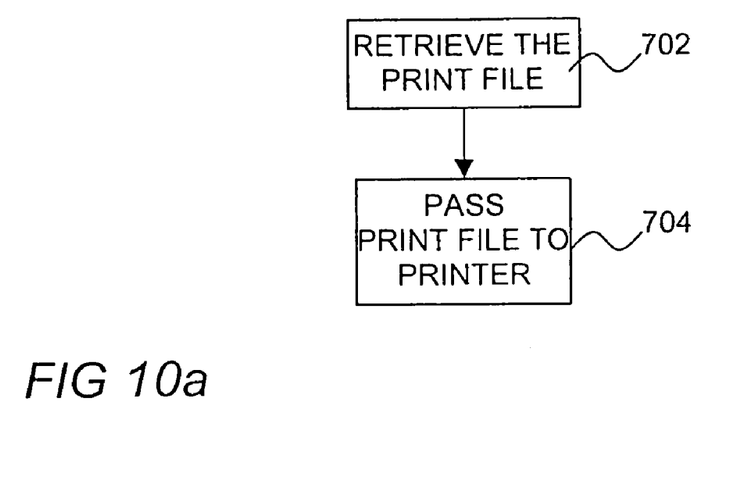

Now referring to FIGS. 1 and 10a, if the communication device 300 is arranged to receive print files via the telephone 100 and the interface for short-range communication 20 or directly via the Internet 10, then the communication device 300 receives the print file, step 702, and passes it to the printer for printing, step 704.

Figure 10B:
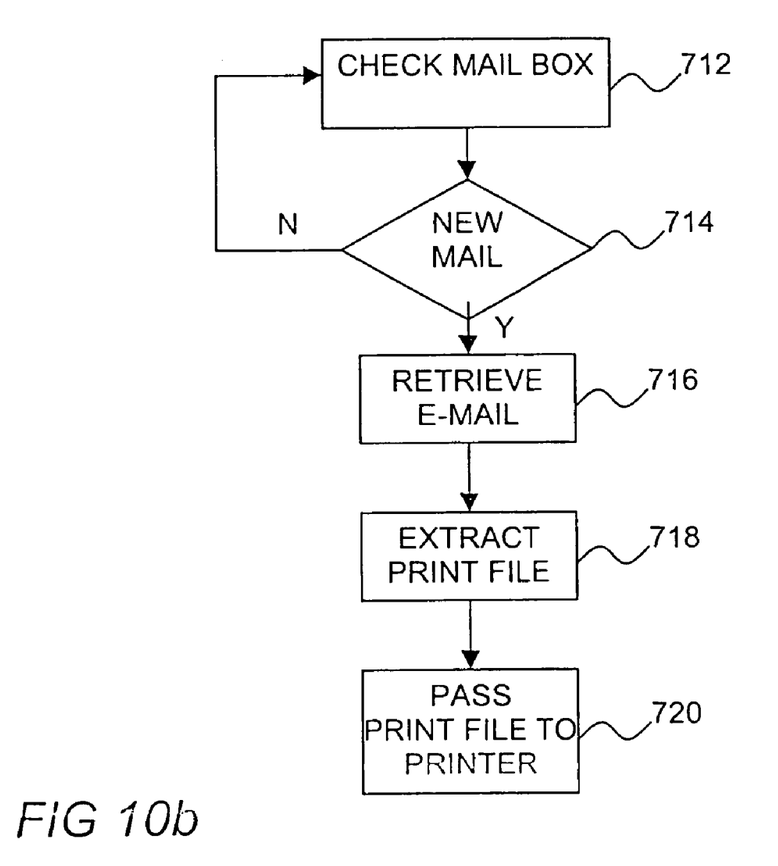

Now referring to FIGS. 1 and 10b, if the communication device 300 is arranged to receive print files via e-mail, then the communication device could check the mail server 390 at predefined time intervals, step 712. If a new mail is present, step 714, then the communication device 300 retrieves the e-mail, step 716, and thereafter extracts the print file from the e-mail, step 718. When the print file is extracted, it is passed to the printer 380 for printing, step 720.

Now the service technician can pick up the document from the printer and begin repairing the robot.

Figure 11:
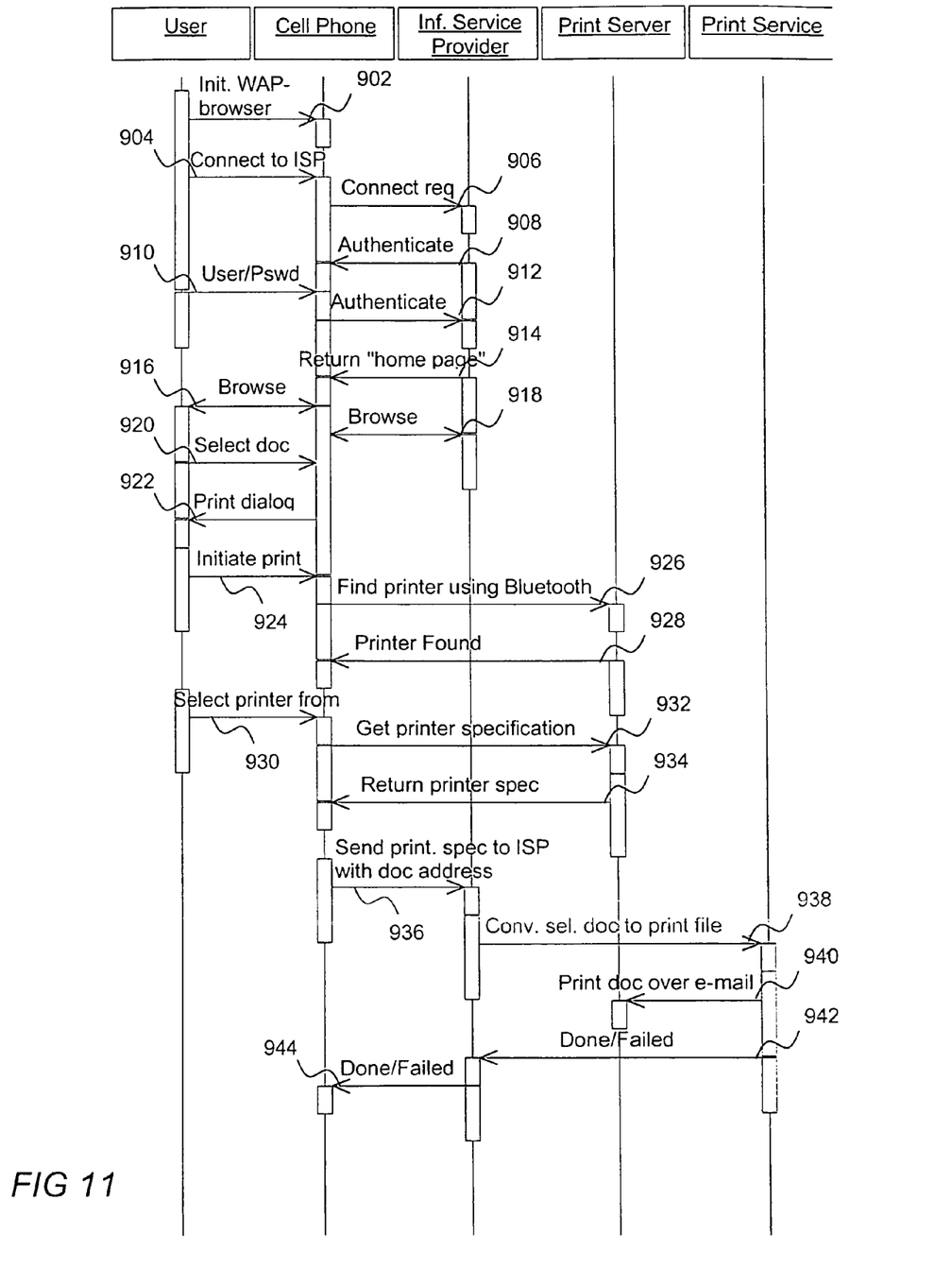
FIG. 11 is a diagram over signals sent between different units of the system according to one embodiment of the invention.

With reference to FIG. 11, an example of communication between devices of the system and between the cellular telephone and a user is presented. The user initiates the WAP-browser of the cellular telephone, event 902. Then he makes the telephone connect to an information service provider, event 904. The telephone sends a connect request 906 to the information service provider. In response the information service provider sends an authentication request 908 to the telephone for authentication of the user. The user types a PIN-code into the telephone, event 910, and the telephone passes the PIN-code and a SIM-code of the subscriber to the information service provider as an authentication message 912. When the information service provider has accepted the user, it sends an initial WAP-page 914 to the telephone. The user is then able to select links on the pages presented on the telephone for browsing the information of the information service provider, event 916. During the browsing the telephone requests pages according to selected links while the information provider responds to the request by sending the requested pages; this corresponds to the bi-directional communication of 918. When the user selects a link to a document that is not a WAP-page, event 920, the telephone presents a print dialog, event 922. If the user chooses to initiate printing, event 924, the telephone broadcasts a message 926 via the short-range communication interface, implementing for example Bluetooth, to all communication devices that are capable of acting as a communication device for the present invention. Said communication devices then respond to the request by sending a message 928, comprising identification information, to the telephone. The user is then prompted to select one of the identified communication devices from a list, if there are more than one responding. If only one is identified, the user has to select that one or abandon the operation. When a communication device is selected, the telephone sends a request 932 for a printer specification to the selected communication device. The selected communication device responds by returning the printer specification 934 to the telephone. Thereafter the telephone sends a request 936, comprising the printer specification and the document address, to the information service provider regarding printing the document at the specified printer. The request is passed 938 to the print service device of the information service provider for conversion of the document to a printable format and for sending the converted document to the selected printer. When the document is converted and if no errors occur, the print service device sends the print file 940 to the communication device, for example via e-mail. When the print file is sent, the information service provider gets a message 942 that the conversion was successful. If the conversion failed, the information provider gets a message 942 that the conversion failed. The message is passed along 944 to the telephone that presents it to the user.

What is claimed is:

1. A method for presentation of documents comprising the acts of:

selecting on a wireless communication device both a document provided by an information service provider and a presentation unit for presentment of the document;

receiving a specification on the wireless communication device from the presentation unit selected in the selecting act, and said specification specifying both a transport route to the presentation unit together with characteristics of the presentation unit; comprising at least one of:

a manufacturer name together with a model number of the presentation unit;

a filename of a device driver compatible with the presentation unit; and a uniform resource locator (URL) of a device driver compatible with the presentation unit;

identifying both a device driver for the presentation unit based on the characteristics of the presentation unit specified in the specification and an application for interpreting the document selected in the selecting act based on a format of the document;

performing a conversion of the selected document to a presentation file suitable for presentment on the presentation unit, utilizing both the application and the device driver identified in the identifying act to perform the conversion; and delivering the presentation file via the transport route specified in the specification to the presentation unit for presentment.

2. The method of claim 1, wherein the transport route in the specification received by the wireless device from the presentation unit in the receiving act specifies at least one of:

an address of the presentation unit, URL of the presentation unit, and an e-mail address associated with the presentation unit.

3. The method of claim 1, wherein the selecting act further comprises:

broadcasting an identity request from the wireless device;

receiving on the wireless device, responses to the identity request from proximate presentation units; and selecting the presentation unit based on the responses to the identity request received in the receiving act.

4. The method of claim 1, wherein the selecting act further comprises the acts of:

establishing a first communication link over a cellular telephonic network between the wireless communication device and the information service provider for selection of the document; and establishing a second communication link over a short-range wireless communication protocol between the wireless communication device and the presentation unit for selection of the presentation unit.

5. A system for presentation of information comprising:

at least one presentation unit configured to respond to an identity request by delivering a specification specifying both a transport route to and characteristics of the presentation unit, comprising at least one of:

a manufacturer together with a model number of the at least one presentation unit;

a filename of a device driver compatible with the at least one presentation unit; and a uniform resource locator (URL) of a device driver compatible with the at least one presentation unit;

at least one information service provider providing documents;

at least one wireless communication device configured to select one of the documents provided by the information service provider to receive the specification from the at least one presentation unit, and to generate a presentation request including the specification and information identifying the selected one of the documents; and a device for handling presentation requests responsive to the presentation request to identify both a device driver for the at least one presentation unit based on the characteristics of the presentation unit in the specification and an application for interpreting the document based on a format of the selected one of the documents; and the device for handling presentation requests configured to convert the selected document to a presentation file suitable for presentment on the at least one presentation unit, utilizing both the identified application and the device driver to perform the conversion; and to deliver the presentation file via the transport route specified in the specification to the at least one presentation unit for presentment.

6. The system of claim 5, wherein the transport route specified in the specification delivered by the at least one presentation unit specifies at least one of:

an address of the presentation unit, an URL of the presentation unit, and an e-mail address associated with the presentation unit.

7. The system of claim 5, further comprising:

the wireless communication device further configured to establish a first communication link over a cellular telephonic network between the wireless communication device and the at least one information service provider for selection of the document; and to establish a second communication link by a broadcast of an identity request and a selection of the at least one presentation unit responding to the identity request utilizing a short-range wireless communication protocol.

8. The system of claim 5, further comprising:

the wireless communication device further configured to establish a first communication link over a cellular telephonic network between the wireless communication device and the information service provider for selection of the document; and a second communication link over a short-range wireless communication protocol with the at least one presentation unit.

9. The system of claim 5, further comprising:

an e-mail server coupled to the at least one presentation unit to accept delivery of the presentation file to the at least one presentation unit via e-mail when the transport route specified in the specification specifies an e-mail delivery of the presentation file.

10. The system of claim 5, wherein further the information services provider comprises a server, and the device for handling presentation requests comprises processes executed on the server.

11. A presentation unit communication device for a presentation unit, comprising:

a short-range wireless communication interface for short-range wireless communications with a wireless communication device;

a presentation unit interface for communication with the presentation unit; and a processor responsive to an identity request received via the short-range wireless communication interface to deliver a specification to the wireless communication device specifying both a transport route for delivery of a presentation file to the presentation unit together with characteristics of the presentation unit, including at least one of: a manufacturer together with a model number of the presentation unit; a filename of a device driver compatible with the presentation unit; and a uniform resource locator (URL) of a device driver compatible with the presentation unit; and the processor further responsive to a delivery of a presentation file from an information service provider to communicate the presentation file via the presentation unit interface to the presentation unit for presentment.

12. The presentation unit communication device of claim 11, wherein the transport route specified in the specification specifies at least one of:
   an address of the presentation unit, an URL of the presentation unit, and an e-mail address associated with the presentation unit.

13. The presentation unit communication device of claim 11, further comprising:
   a network interface for communication over a network with the information service provider and receipt there from of the presentation file.

14. A wireless communication device comprising:
   a short-range wireless communication interface for short range wireless communications;
   a telephonic interface for cellular telephonic network communications; and
   a processor responsive to user inputs to establish via the telephonic interface a telephonic communication link with an information service provider providing documents, to establish via the short-range wireless communication interface a short-range wireless communication link with a presentation unit, for receipt therefrom a specification specifying both a transport route to the presentation unit together with characteristics of the presentation unit, including at least one of; a manufacturer together with a model number of the presentation unit; a filename of a device driver compatible with the presentation unit; and a uniform resource locator (URL) of a device driver compatible with the presentation unit; and to forward the specification to the information service provider via the telephonic communication link, thereby to initiate conversion of a document provided by the information service provider to a corresponding presentation file, and delivery via the specified transport route of the corresponding presentation file to the presentation unit for presentment.

15. The wireless communication device of 14, further comprising:
   a processor further responsive to user inputs to broadcast an identity request via the short-range wireless communication interface and to establish the short-range communication link with a selected presentation unit responding to the identity request.

* * * * *